United States Patent
Cho et al.

(10) Patent No.: US 6,678,059 B2
(45) Date of Patent: Jan. 13, 2004

(54) APPARATUS FOR MEASURING 6-DEGREE-OF-FREEDOM MOTIONS OF RIGID BODY BY USING THREE-FACET MIRROR

(75) Inventors: Hyung Suck Cho, Taejon (KR); Won Shik Park, Seoul (KR); Yong Kyu Byun, Yongin-si (KR); Noh Yeol Park, Yongin-si (KR)

(73) Assignee: Korean Advanced Institute of Science and Technology, Taejon (KR)

( * ) Notice: Subject to any disclaimer, the term of this patent is extended or adjusted under 35 U.S.C. 154(b) by 135 days.

(21) Appl. No.: 09/879,273

(22) Filed: Jun. 13, 2001

(65) Prior Publication Data

US 2003/0011787 A1 Jan. 16, 2003

(30) Foreign Application Priority Data

Apr. 24, 2001 (KR) .......................................... 2001-22140

(51) Int. Cl.⁷ .......................... G01B 11/14; G01N 21/86
(52) U.S. Cl. .................. 356/614; 356/622; 356/139.03; 356/139.07; 250/559.29
(58) Field of Search ................................ 356/614, 622, 356/139.03, 139.07; 250/559.29

(56) References Cited

U.S. PATENT DOCUMENTS

| | | | |
|---|---|---|---|
| 3,241,430 A | * | 3/1966 | Kulick |
| 3,427,108 A | * | 2/1969 | Vyce |
| 4,422,753 A | * | 12/1983 | Pryor |
| 4,610,172 A | * | 9/1986 | Mickle et al. |
| 5,267,014 A | * | 11/1993 | Prenninger |
| 5,552,883 A | * | 9/1996 | Busch-Vishniac et al. |
| 5,742,394 A | * | 4/1998 | Hansen |
| 5,784,168 A | * | 7/1998 | Ophey et al. |
| 5,835,278 A | * | 11/1998 | Rubin et al. |
| 6,459,092 B2 | * | 10/2002 | Cho et al. |

OTHER PUBLICATIONS

Korean Patent Application No. 99–00977.
Korean Patent Application No. 00–24654.
Korean Patent Application No. 00–24653.

* cited by examiner

*Primary Examiner*—Ricky D. Shafer
(74) *Attorney, Agent, or Firm*—Vidas, Arrett & Steinkraus

(57) ABSTRACT

An apparatus for measuring six-degree-of-freedom motions by using three-facet reflector, the six-degree-of-freedom motions of an object being measured by using the laser beam proceeding from a laser light source, comprising: a multiple facet reflector in the form of a trigonal pyramid, the multiple facet reflector being fixed on the object for measurement and able to reflect the laser beam in three directions; three position-sensitive detectors for measuring the position and intensity of the laser light points formed on their surfaces, with the movement of the multiple facet reflector, and then providing output signals; and a controlling section for analyzing six-degree-of-freedom motions of the multiple facet reflector by using the position and intensity of the laser light points output from the three position-sensitive detectors. (FIG. 4).

3 Claims, 8 Drawing Sheets

APPARATUS FOR MEASURING 6-DEGREE-OF-FREEDOM MOTIONS OF RIGID BODY BY USING THREE-FACET MIRROR

FIELD OF THE INVENTION

The present invention relates to an apparatus for measuring 6-degree-of-freedom motions of a rigid body by using a three-facet reflector wherein the measurement of the 6-degree-of-freedom displacements of an object, particularly an object in motion with a high-speed, can be made with ease and with accuracy, and specially the measuring precision is excellent.

BACKGROUND OF THE INVENTION

Generally, there are various ways for expressing the position and orientation of a body situated in a three dimensional space.

In one of widely used methods, the position is expressed as a position vector on rectangular coordinate system for three dimensional space and the orientation is expressed by means of Euler's angle expression, in which the rotated angle for an object relative to the x, y and z axis of a reference coordinate system is expressed as $\gamma$, $\beta$ and $\alpha$ respectively, the rotated angles being called as the roll, pitch and yaw.

Referring to FIG. 1, which shows the rectangular coordinate as defined in the three dimensional space, the position and orientation of an arbitrary object for which measurement is to be taken and which moves with 6-degree-of freedoms are illustrated. The coordinate system $O_w$ is the reference coordinate system to express the motion of an object 1. For a portion of the object 1 in the drawing, the coordinate systems $O_{w'}$ and $O_s$ are defined. The coordinate system $O_s$ is the coordinate system fixed on the rigid body and moving integrally with the object 1.

Further, the coordinate system $O_{w'}$ maintains the same orientation as the reference coordinate system $O_w$ and shares the origin with the coordinate system $O_s$. In the drawing, the vector $$\vec{T^w} = [t_x \quad t_y \quad t_z]^T$$

is the position vector for expressing the position of the object 1 defined by the coordinate system $O_s$. Further, the equation:

$$T_s^w = \begin{bmatrix} c\alpha c\beta & c\alpha s\beta s\gamma - s\alpha c\gamma & c\alpha s\beta c\gamma + s\alpha s\gamma & t_x \\ s\alpha c\beta & s\alpha s\beta s\gamma + c\alpha c\gamma & s\alpha s\beta c\gamma - c\alpha s\gamma & t_y \\ -s\beta & c\beta s\gamma & c\beta c\gamma & t_z \\ 0 & 0 & 0 & 1 \end{bmatrix}, \quad \text{(Equation 1)}$$

wherein stand for and other abridgements have the similar meanings, is the matrix defined by $t_x$, $t_y$, $t_z$, $\gamma$, $\beta$ and $\alpha$, which expresses the position and orientation of the coordinate system $O_s$ moved relative to the reference coordinate $O_w$. As the coordinate system $O_s$ is fixed to the object 1, this matrix can be used to show the position and orientation of the object.

As described above, the determination of the position and orientation of an object in the three dimensional space may be regarded as the problem of determining the 6 values for $t_x$, $t_y$, $t_z$, $\gamma$, $\beta$ and $\alpha$.

The three-facet reflector used for the measuring apparatus in the present invention was initially suggested in a patent application (Korean patent application No. 99-00977) previously filed. The disclosure in the patent application was intended to determine six-degree-of-freedom motions by attaching a three-facet reflector on the slider of a hard disk drive (HDD). However, while a laser beam was needed to enter the apex of the three-facet reflector for the given purpose, a specific method therefor was not proposed in the disclosure.

Further, the mathematical equations proposed there were derived on the base of the hypothesis that the apex of a three-facet reflector and the laser light spots formed on three position-sensitive detectors form the same one plane. As the hypothesis is not precise in view of the fact, however, the equations can not be applied to the practice. Therefore, that exclusive patent application is not sufficient to achieve the goal.

There is also known a method for measuring six-degree-of-freedom displacements of an object (Korean patent application No. 00-24654) by using the three-facet reflector as proposed in the above-described patent. The arrangement of the apparatuses as proposed in that patent is shown in FIG. 2. On the object, a mirror in the form of a trigonal pyramid as the three-facet reflector 110 is mounted. The three-facet reflector 110 is supplied with a laser beam at its top apex so as to produce three branches of reflected beams, which are detected by three laser beam position-sensitive detectors PSD's 121, 122 and 123. The position-sensitive detectors 121, 122 and 123 comprise ordinary sensor elements for outputting the locations of centroids for incident laser beams in the form of voltage signal, so that the coordinates of sets of three positions from three position-sensitive detectors 121, 122 and 123 may be used to determine the six-degree-of-freedom displacements tx, ty, tz, $\gamma$, $\beta$ and $\alpha$ of the three-facet reflector 110. As indicated in the drawing, the laser source follows with two degrees of freedom, as the three-facet reflector 110 makes movement. In order to follow the movement of three-facet reflector 110, the two-degree-of-freedom position of the light source is controlled, so that the intensity of laser beam incident to the three position-sensitive detectors 121, 122 and 123 may be maintained the same, by comparing the intensity of laser beam incident to the respective position-sensitive detectors 121, 122 and 123. This invention is pertinent to the application filed by the present inventors, which realized the laser-tracing method not embodied in the previous patent application (No. 99-00977). However, this method is still insufficient to follow high-speed movements.

FIG. 3 shows the arrangement of a special apparatus as disclosed in Korean patent application No.00-24653, which functions to determine six-degree-of-freedom movements of a HDD slider based on the principle disclosed in Korean patent application No.00-24654. Arms of a two-stage swing arm 140 run parallel to each other and connected to a pivot 14 at the rear end, so that the two-stage swing arm 140 can rotate around the axis of the pivot 14. The lower arm member includes an E-block 16, suspension 18 and flexure piece 19, to the underside of which piece a slider 20 is fixed. The actuator for driving the slider 20 in the form of a voice coil motor(VCM) 12 is disposed on the rear part of the two-stage swing arm 140. The upper arm member of the swing arm 140 is composed of a rigid body resisting an elastic deformation. A three-facet reflector 110 is fixed on the upper side of the slider 20. Right above the apex of the three-facet reflector 110 there is formed a light permeating hole 143 on the leading edge of the upper arm member, while the first reflector 151 and the second reflector 152 are fixed on the top face of the upper arm member of the swing arm 140. A laser beam which has passed the first and second reflectors 151 and 152 arrives at the three-facet reflector 110 through the hole 143 and then the ray reflected thereon is projected to three position-sensitive detectors 121, 122 and 123. In this invention, a two stage swing arm is proposed, so that the laser beam may be projected constantly in the apex of a three-facet reflector which moves together with the HDD slider, because existing ordinary laser-tracing apparatuses were impossible to make a precise tracing due to the high-speed motion of the HDD slider.

As described above, in the method for determining six-degree-of-freedom variables by using a three-facet reflector, a method by which a laser beam can be precisely projected to the apex of the three-facet reflector by tracing precisely the movement of the three-facet reflector has been recognized as an very important issue.

SUMMARY OF THE INVENTION

The present invention modified the conventional principle of the measurement of six-degree-of-freedom motions as applied to a three-facet reflector in order to resolve the problems associated with laser tracing in the existing art.

Thus the object of the invention is to provide an apparatus for measuring six-degree-of-freedom motions of an object by using a three-facet reflector wherein a mechanical tracing mechanism is not needed due to the unnecessity of tracing the laser and so measurement of a high-speed movement is possible due to the independence of a mechanical speed restriction.

The object as described above is achieved according to the invention by an apparatus for measuring six-degree-of-freedom motions by using three-facet reflector, the six-degree-of-freedom motions of an object being measured by using the laser beam proceeding from a laser light source, comprising: a three-facet reflector in the form of a trigonal pyramid, the three-facet reflector being fixed on the object for measurement and able to reflect the laser beam in three directions; three position-sensitive detectors for measuring the position and intensity of the laser light points formed on their surfaces, with the movement of the three-facet reflector, and then providing output signals; and a controlling section for analyzing six-degree-of-freedom motions of the three-facet reflector by using the position and intensity of the laser light points output from the three position-sensitive detectors.

Preferably, the range of movement for the three-facet reflector lies within the area irradiated by the laser beam.

Also, according to a feature of the invention, a reflector may comprise more than 3 facets and the same number of position detectors should be used.

DETAILED DESCRIPTION OF THE INVENTION

Preferred embodiments of the invention will be described in detail below by referring to the accompanying drawings.

Figure 4:
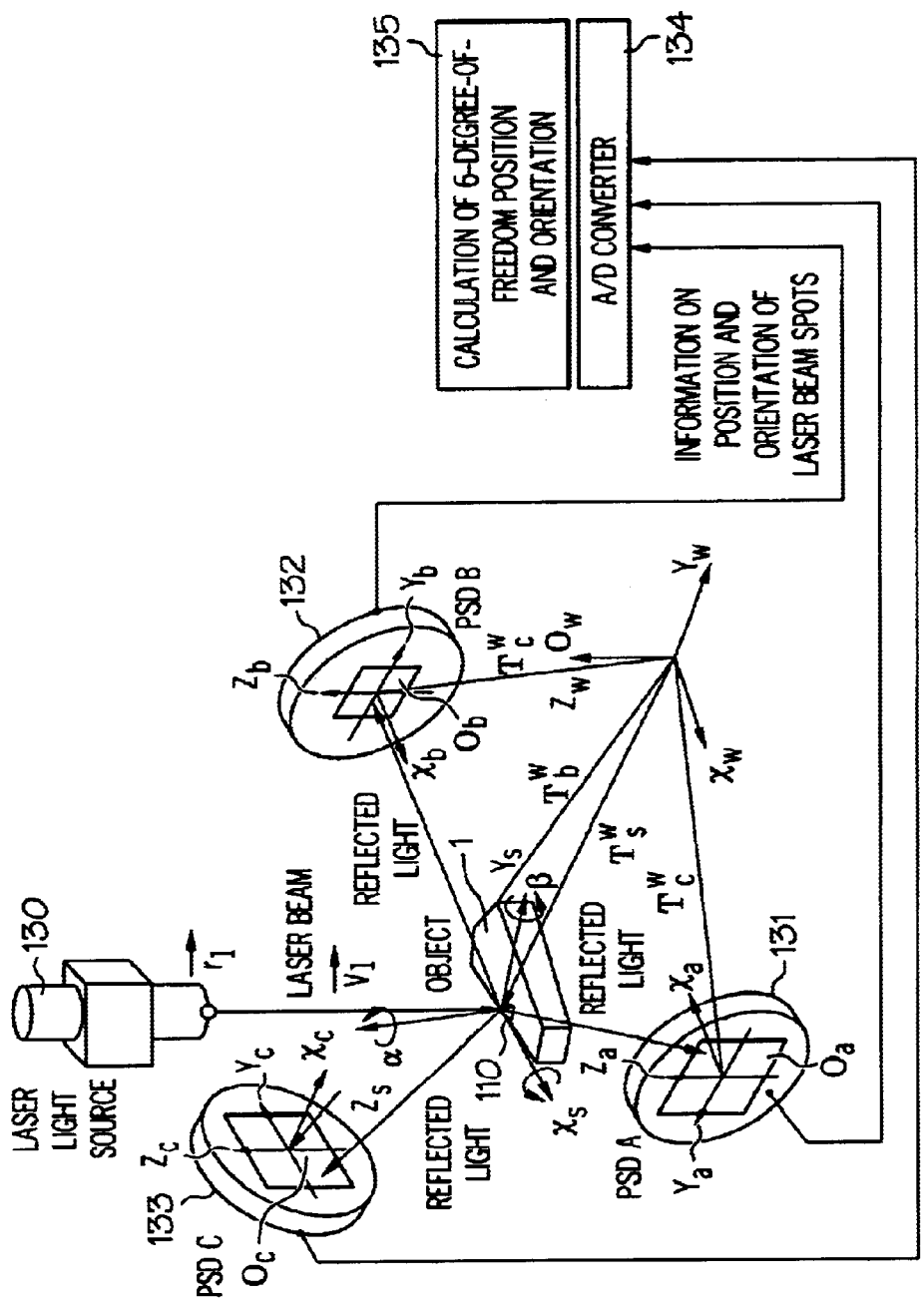
FIG. 4 shows the view of component arrangement for the apparatus for precisely measuring six-degree-of-freedom motions according to the invention.

FIG. 4 shows the measuring apparatus according to an embodiment of the invention. Centrally in a position vertically above the measuring apparatus, a laser light source 130 is fixed. A three-facet reflector 110 is fixed on an object under measurement and the laser beam is irradiated on the apex of the reflector. Three branches of reflected laser beam from the three-facet reflector are directed to three position-sensitive detectors (PSD) 131, 132 and 133.

The position-sensitive detectors 131, 132 and 133 comprise the sensors which output the voltage signals corresponding to the positions of the laser beam received, and output the intensity of the laser beam fell on the input surfaces. While the position-sensitive detectors are fixed, they provide the output signals by measuring the positions and intensities of laser light spots formed on their surfaces as the three-facet reflectors 110 moves.

Figure 1:
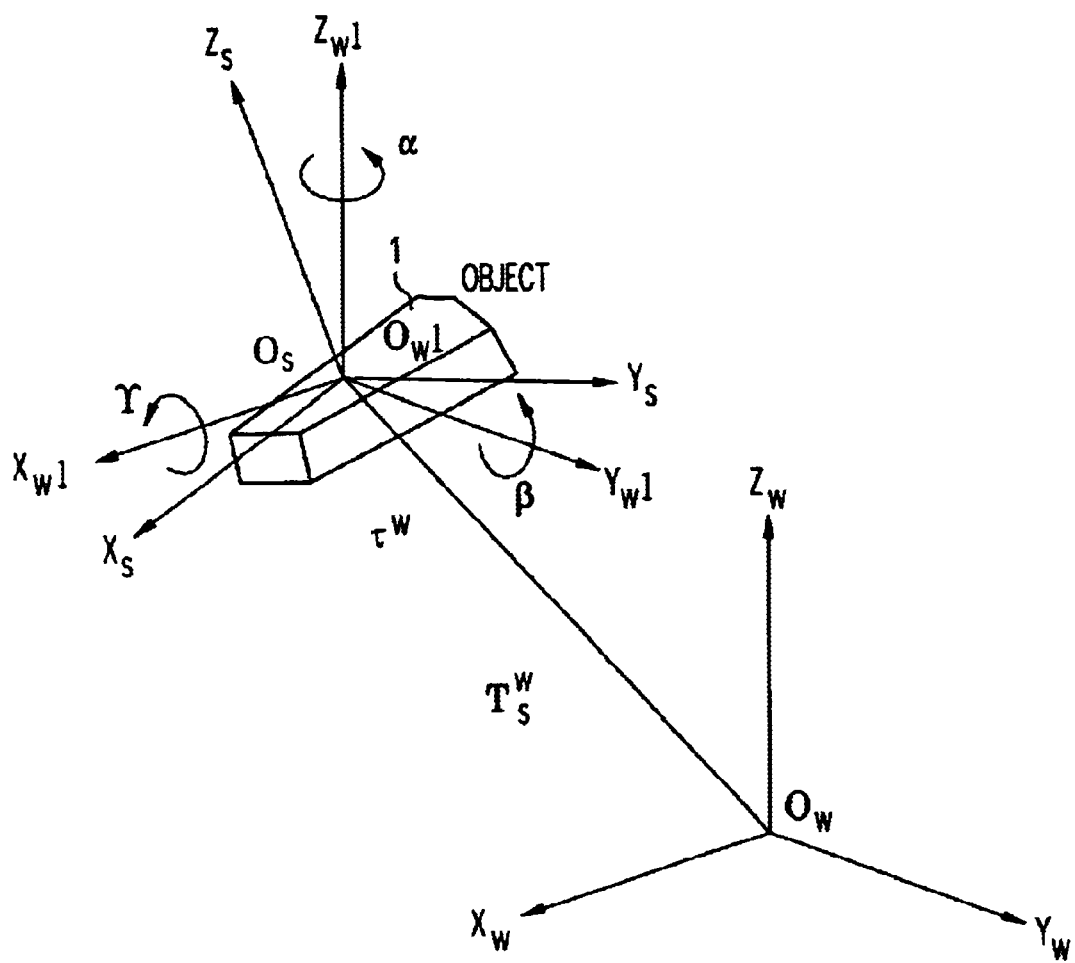
FIG. 1 shows the drawing for defining the expressing method and symbols for six-degree-of-freedom motions.
Figure 2:
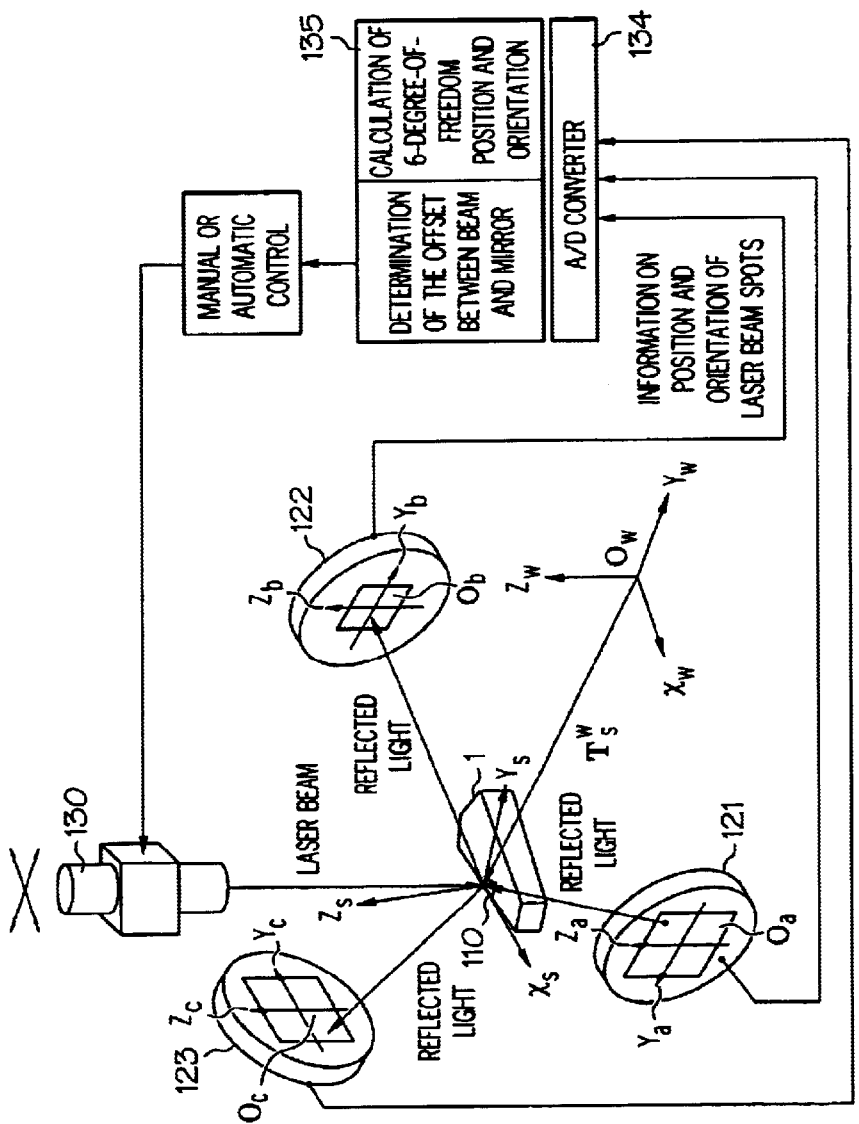
FIG. 2 shows the arrangement of an apparatus with a three-facet mirror for measuring six-degree-of-freedom motions according to a conventional art, wherein a laser tracing technique is applied.
Figure 3:
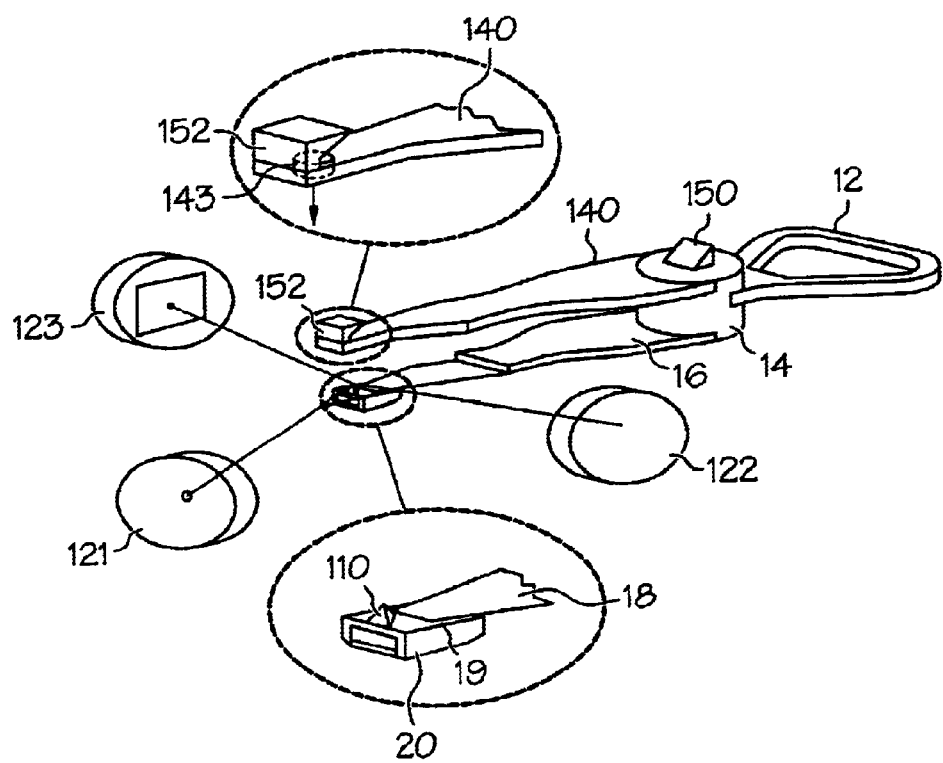
FIG. 3 shows an illustrative perspective view of a apparatus for measuring six-degree-of-freedom motions of a slider of hard disk drive according to a conventional art based on the method represented in FIG. 2.

Although the arrangement in FIG. 4 appears similar to that in FIG. 2, the laser position controller is omitted in FIG. 4, because the method proposed in the present invention does not necessitate following the apex of a three-facet reflector 110. However, the range for the movement of the three-facet reflector 110 is limited within the area of laser irradiation, because the reflection of laser beam should be used. Further, the algorithm for estimating the offset between the laser beam and the thee facet reflector as required in FIG. 2 is not needed here.

As shown in FIG. 4, according to the invention, when three branches of laser beam reflected from the three-facet reflector 110 are fell on three position-sensitive detectors 131, 132 and 133, the six 6-degree-of-freedom variables for the position and rotational orientation of the object can be determined based on the information of positions and intensities for the laser light spots as output from the respective position-sensitive detectors 131, 132 and 133. The signals output from the position-sensitive detectors 131, 132 and 133 are converted into digital ones by an A/D converter 134 and stored in a memory of the control section 135 for processing.

Figure 5:
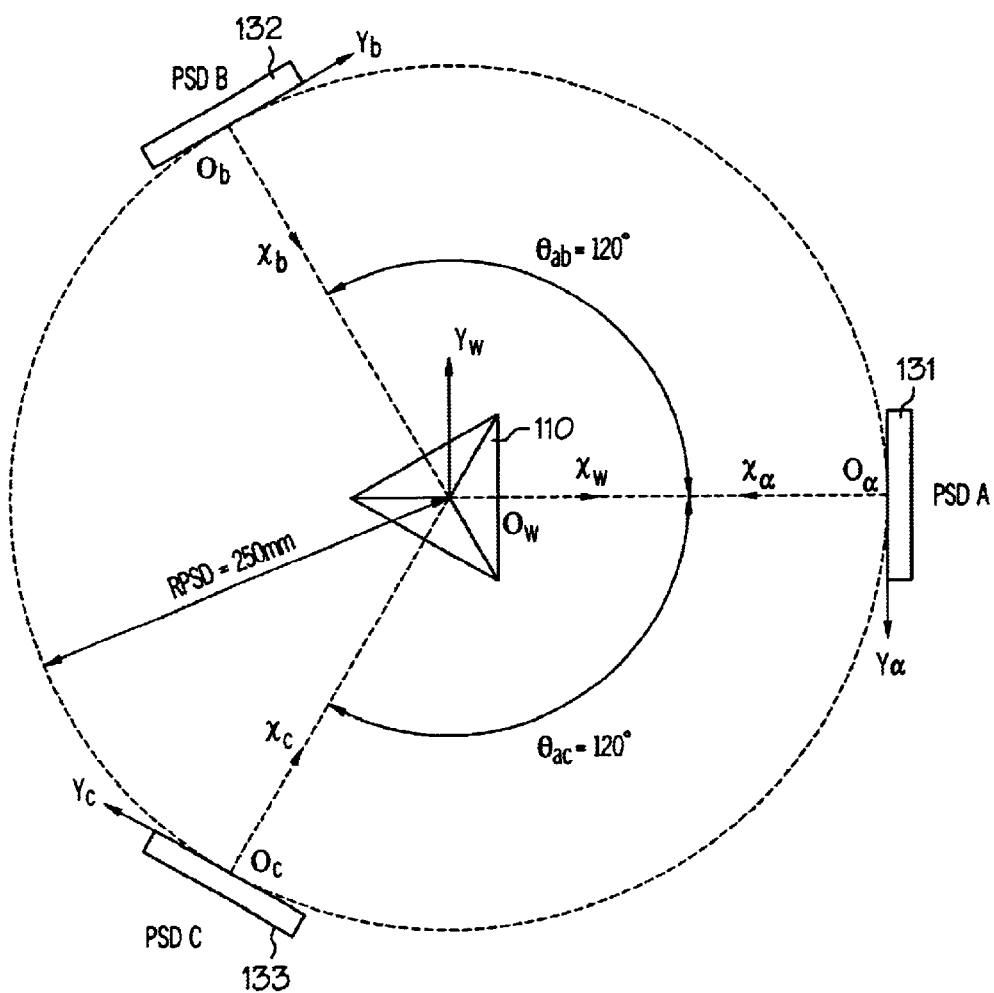
FIG. 5 shows one exemplar view for setting system variables for the measuring apparatus according to the invention.

FIG. 5 shows the plan view of an exemplar arrangement for the measuring apparatus according to the invention, illustrating how three position-sensitive detectors 131, 132 and 133 are arranged with regard to the origin of the measuring apparatus.

The laser light source, which is not shown in the drawing, is to be considered as aligned in a vertical direction to the paper plane. As shown, the three-facet reflector 110 is located at the origin of the measuring apparatus. The three position-sensitive detectors 131, 132 and 133 are arranged around the measuring apparatus at an equal angular spacing of 120°, however the angles between the detectors may be different therefrom.

For the present measuring apparatus, the determination of six variables is possible when the position-sensitive detectors are arranged where the laser light reflected from the three-facet reflector 110 can be detected. However, the measurement precision may vary somewhat depending on the spaced angles and the distance from the center of the measuring apparatus. The distance from the center of the measuring apparatus need not be the same for each of three position-sensitive detectors 131, 132 and 133.

The determination of the position and orientation of the three-facet reflector 110 by using the output of three position-sensitive detectors 131, 132 and 133 necessitates a mathematical model of the relation between 6 variables of the three-facet reflector 110 and the outputs of the three position-sensitive detectors 131, 132 and 133.

In the present invention, there were derived a series of equations for determining the outputs of three position-sensitive detectors 131, 132 and 133 initiated by a three-facet reflector 110 with arbitrary 6-degree-of-freedom displacements, because derivation of a direct equation or explicit form for determining 6-degree-of-freedom displacement of a three-facet reflector 110 based on three PSD outputs is very difficult.

Figure 6:
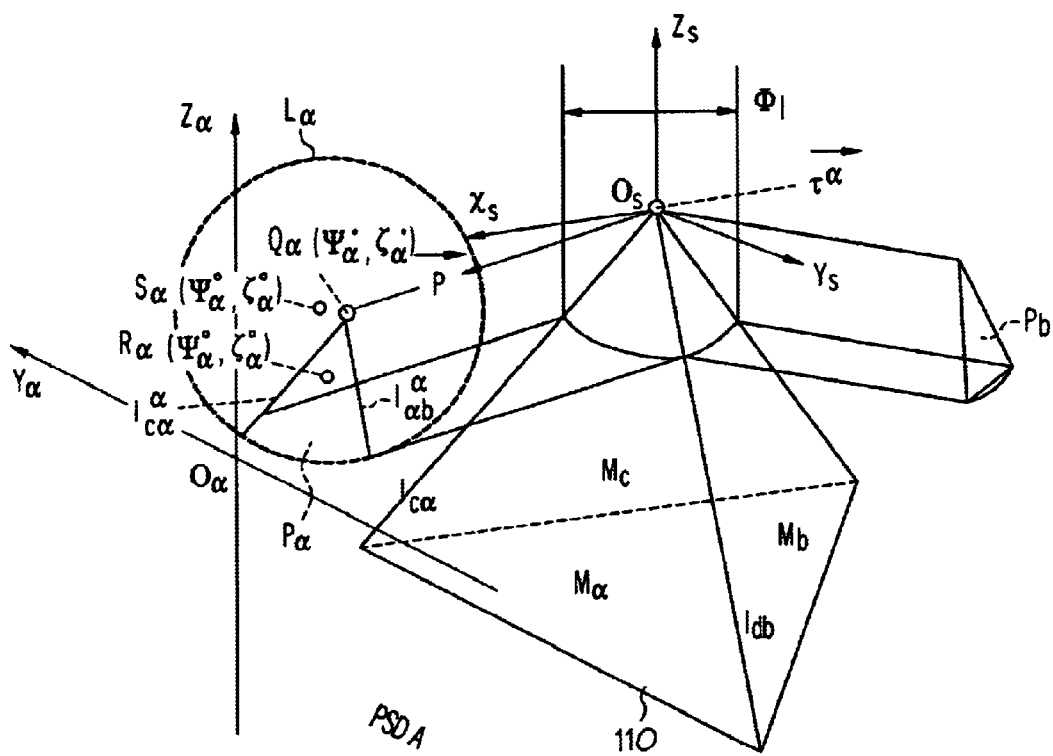
FIG. 6 shows the view for illustrating that the light reflected from a three-facet reflector is fell on the first position-sensitive detector in the measuring apparatus according to the invention.

FIG. 6 shows, for the first position-sensitive detector (PSD A) 131, the illustration of the circumstance that the laser beams reflected by the three-facet reflector 110 fall on the position-sensitive detectors 131, 132 and 133, together with the coordinate systems. In the same drawing, the three position-sensitive detectors 131, 132 and 133 are individualized as the first position-sensitive detectors (PSD A) 131, the second position-sensitive detectors (PSD B) 132 and the third position-sensitive detectors (PSD C) 133, and the three mirror facets of the three-facet reflector 110 corresponding to the first, second and third position-sensitive detectors 131, 132 and 133 are designated as $M_a$, $M_b$ and $M_c$.

Here, when the position and orientation of the three-facet reflector 110 with regard to the reference coordinate system are known in detail, the vector of surface normal for the mirror facet $M_a$ can be determined through a fundamental analytic geometry. Letting $[l_a \ m_a \ n_a]^T$ as the surface normal vector of the mirror facet $M_a$, then the reflection matrix of $M_a$ is as follows:

$$M_a^w = \begin{bmatrix} 1 - l_a^2 & -2l_a m_a & -2l_a n_a \\ -2l_a m_a & 1 - 2m_a^2 & -2n_a m_a \\ -2l_a n_a & -2n_a m_a & 1 - 2m_a^2 \end{bmatrix} \quad \text{(Equation 2)}$$

And letting $$\vec{v}_l^w$$

as the direction vector of the laser beam incident to the apex of the three-facet reflector 110, then the direction vector of the reflected ray reflected by the facet $M_a$ can be determined by the following Equation 3:

$$\vec{v}_a^w = [v_{ax} \ v_{ay} \ v_{az}]^T = M_a^w \vec{v}_l^w \quad \text{(Equation 3)}$$

Here, is the expression for the direction vector of the reflected ray with reference to the coordinate system $O_w$. Similarly, the direction vector of the reflected ray as expressed with reference to the coordinate system $O_a$ for the first detector 131 will be the same as the following Equation 4:

$$\vec{P} = [P_x \ P_y \ P_z]^T = R_a^{w-1} \vec{v}_a^w \quad \text{(Eq. 4)}$$

wherein $$R_a^{w-1}$$

is the reverse matrix of the matrix defining the rotational displacement of $O_a$ with respect to $O_w$. The position vector of the three-facet reflector with reference to the coordinate system $O_a$ of the PSD A 131 can be determined by the following Equation 5:

$$\vec{t}^a = [t_x^a \ t_y^a \ t_z^a \ 1]^T = T_w^a \vec{t}^w \quad \text{(Equation 5)}$$

wherein $$T_w^a$$

means a homogeneous transform that represents the inversion of $$T_a^w,$$

as can be seen in FIG. 4. And, $$\vec{t}^w \text{ and } \vec{t}^a$$

are the provisional expressions of $$\vec{P} = [p_x \ p_y \ p_z]^T \text{ and } \vec{t}^a = [t_x^a \ t_y^a \ t_z^a]^T$$

to be adapted to homogeneous transform.

$$\vec{t}^w = [t_x \ t_y \ t_z \ 1]^T \quad \text{(Equation 6)}$$

When $$\vec{p} = [p_x p_y p_z]^T \text{ and } \vec{t}^a = [t_x^a t_y^a t_z^a]^T$$

are determined through the procedure as described above, the coordinate $(\psi_a^*, \zeta_a^*)$ of the light spot $Q_a$ formed on the first position-sensitive detector 131 can be determined by using the following Equations 7.

$$\psi_a^* = -\frac{p_y}{p_x}t_x^a + t_y^a \qquad \text{(Equation 7)}$$

$$\zeta_a^* = -\frac{p_z}{p_x}t_x^a + t_z^a$$

In the same way, for the second and third position-sensitive detectors 132 and 133 as well, the coordinates of the light spots $Q_b$ and $Q_c$ formed on the surfaces of the detectors can be determined. The coordinates of the light spots $Q_b$ and $Q_c$ formed on the second position-sensitive detector 132 and the third position-sensitive detector 133, so determined, will be designated as $(\psi_b^*, \zeta_b^*)$ and $(\psi_c^*, \zeta_c^*)$. Conclusively, in the procedure as described above, the coordinates $(\psi_a^*, \zeta_a^*)$, $(\psi_b^*, \zeta_b^*)$ and $(\psi_c^*, \zeta_c^*)$ of the light spots $Q_a$, $Q_b$ and $Q_c$ formed on the three position-sensitive detectors 131, 132 and 133 can be determined from the six 6-degree-of-freedom displacements $t_x$, $t_y$, $t_z$, $\gamma$, $\beta$ and $\alpha$ of the three-facet reflector.

The coordinates of the points $Q_a$, $Q_b$ and $Q_c$ determined in the procedure as described above may be considered as a kind of outputs of position-sensitive detectors but with a great deal of errors. That is, if the laser beam is an ideal straight line with zero diameter, the centroids for the light spots formed on position-sensitive detectors and the above-described light points $Q_a$, $Q_b$ and $Q_c$ would agree with each other. However, in fact, because a laser beam has a predetermined diameter, the coordinates of the points $Q_a$, $Q_b$ and $Q_c$ determined as described above include large errors.

Next, the measurement based on Gaussian laser beam model is described in detail.

As suggested, the outputs $(\psi_a^*, \zeta_a^*)$, $(\psi_b^*, \zeta_b^*)$, $(\psi_c^*, \zeta_c^*)$ of the position-sensitive detectors are the result of calculation based on the assumption that the laser beam is an ideal straight line. However, in reality, the laser beam is observed as having a circular cross section with a certain diameter.

FIG. 6 shows in realistic manner that a laser beam with the diameter of $\phi_1$ is detected on the position-sensitive detectors 131 through a three-facet reflector. As shown in the drawing, the laser beam incident to the upper apex of the three-facet reflector 110 is divided into three branches by the mirror facets of the reflector.

Each laser beam so divided has the cross section of a pie piece, as can be seen in the drawing, because the three mirror surfaces concentrating on the apex of the reflector are each formed of a triangle. When laser beams with the cross section of a pie piece are projected on position-sensitive detectors 131, 132 and 133, the position-sensitive detectors 131, 132 and 133 each output the information corresponding to the centroid of the light distributed over the cross section of a pie piece.

In FIG. 6, the position of the centroid for the laser light spot Pa (shown as an area in the drawing) formed on the surface of the first position-sensitive detector 131 is shown as the point $R_a(\psi_a, \zeta_a)$, which is situated somewhat below the point $Q_a(\psi_a^*, \zeta_a^*)$, corresponding to the output in the case of assuming the laser beam as an ideal straight line. The position $R_a(\psi_a, \zeta_a)$ is situated lower, as it represents the centroid of the laser intensity distribution over the cross section. The area $L_a$ represents the laser light spot in the case of the assumption that the laser beam is not divided by the three-facet reflector and is reflected by a plane mirror in the same position and orientation as the mirror surface $M_a$, and the point $S_a$ is the centroid of $L_a$.

A procedure for determining the outputs of the position-sensitive detectors 131 132 and 133 is described below by taking into consideration of laser intensity distribution.

Figure 7:
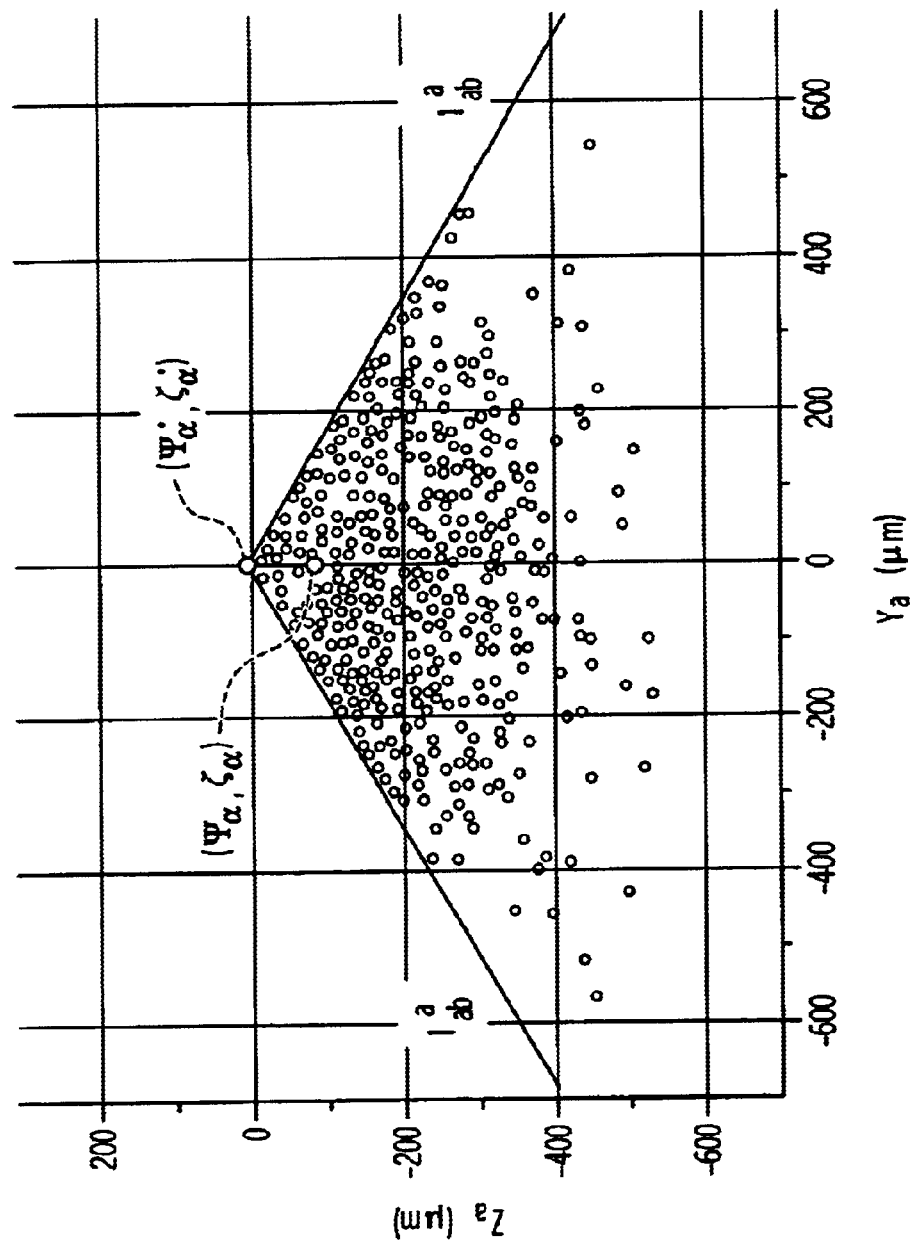
FIG. 7 shows an illustrative view for representing, in terms of dot density, the intensity distribution of the laser light point formed on the first position-sensitive detector, when a laser beam having the intensity distribution in the form of Gaussian function was used in the invention.

In the present invention the laser beam is assumed to be a Gaussian beam with a circular cross section. In the case of a Gaussian beam with the power output of P and diameter of $\phi_l$, the internal intensity in terms of the light power of the laser beam passing through unit area within the beam cross section has the following distribution in the form of Gaussian function:

$$I(r) = \frac{8P}{\pi\phi_l^2}\exp\left(-\frac{8r^2}{\phi_l^2}\right) \qquad \text{(Equation 8)}$$

wherein r stands for the radial distance from the central axis of the laser beam. The laser beam having such an intensity distribution is divided into three branches at the three-facet reflector and so forms an image on the surface of e.g. the first detector 131 as shown in FIG. 7. The density of dots at various locations in the drawing represents the local intensity of the laser beam.

The density of laser beam varies depending on the incident angle of the laser beam to position-sensitive detectors 131, 132 and 133 and the diameter $\phi_l$ of the laser beam emitting from a light source as well as the power output of the source. FIG. 7 shows the intensity distribution of the light spot, wherein the laser beam reflected from the three-facet reflector and incident to the first position-sensitive detector 131 is vertical to the surface of the detector 131, and the diameter $\phi_l$ of the laser beam amounts to 460 $\mu$m. The laser light spot formed on the first position-sensitive detector 131 is represented by Pa and the two sides defining the light spot are represented by the symbols $l_{ab}^a$ and $l_{ac}^a$.

$l_{ab}^a$ and $l_{ac}^a$ are the lines made apparent on the surface of the PSD A 131 from projection of the edges $l_{ab}$ and $l_{ac}$ of the three-facet reflector 110 on the PSD A. The determination of the centroid $R_a$ of the laser intensity within the laser light spot $P_a$ formed on the first position-sensitive detector 131 is possible by using the following Equation 9:

$$\psi_a = \frac{\int_{P_a}\int y_a I_a(r_a)dy_a dz_a}{\int_{P_a}\int I_a(r_a)dy_a dz_a} \qquad \text{(Equation 9)}$$

$$\zeta_a = \frac{\int_{P_a}\int z_a I_a(r_a)dy_a dz_a}{\int_{P_a}\int I_a(r_a)dy_a dz_a}$$

Here, $r_a$ and $I_a(r_a)$ in the above equations can be expressed by the following equations respectively:

$$r_a = \sqrt{(y_a - \psi_a^o)^2\frac{p_x^2}{p_x^2 + p_y^2} + (z_a - \zeta_a^o)^2\frac{p_x^2}{p_x^2 + p_z^2}} \qquad \text{(Equation 10)}$$

$$I_a(r_a) = \frac{\vec{p}\cdot\vec{x}_a}{\|\vec{p}\|}I(r_a)$$

Herein, $(\psi_a^o, \zeta_a^o)$ is the coordinate of La as shown in FIG. 6.

The intensity $\Phi_a$ of the laser beam incident to the first position-sensitive detector 131 can be determined by integrating beam intensities distributed within the laser light spot formed on the first position-sensitive detector 131, as follows:

$$\Phi_a = \int_{P_a} \int I_a(r_a) dy_a dz_a \qquad \text{(Equation 11)}$$

For the case of the second and third position-sensitive detectors 132 and 133 as well, the output values ($\psi_b, \zeta_b, \Phi_b$) and ($\psi_c, \zeta_c, \Phi_c$) of the second and third position-sensitive detectors 132 and 133 can be determined in the same manner as in the above case of the first position-sensitive detector 131 also in consideration of the laser beam with the distribution of Gaussian function.

As described above, the output values ($\psi_a, \zeta_a, \Phi_a$), ($\psi_b, \zeta_b, \Phi_b$) and ($\psi_c, \zeta_c, \Phi_c$) of the first, second and third position-sensitive detectors 131, 132 and 133 can be determined from the given six-degree-of-freedom displacements $t_x$, $t_y$, $t_z$, $\gamma$, $\beta$ and $\alpha$ for the three-facet reflector.

In the following, the determination of six-degree-of-freedom displacements through numeric analysis is described in detail.

In the foregoing, the procedure for determining the output values ($\psi_a, \zeta_a, \Phi_a$), ($\psi_b, \zeta_b, \Phi_b$) and ($\psi_c, \zeta_c, \Phi_c$) of the three position-sensitive detectors 131, 132 and 133 by using six-degree-of-freedom displacements $t_x$, $t_y$, $t_z$, $\gamma$, $\beta$ and $\alpha$ of a three-facet reflector 110 was described. However, in performing a practical measurement, in contrary to the above procedure, six-degree-of-freedom displacements of a three-facet reflector should be determined, with the output values ($\psi_a, \zeta_a, \Phi_a$), ($\psi_b, \zeta_b, \Phi_b$) and ($\psi_c, \zeta_c, \Phi_c$) of the three position-sensitive detectors 131, 132 and 133 given.

Figure 8:
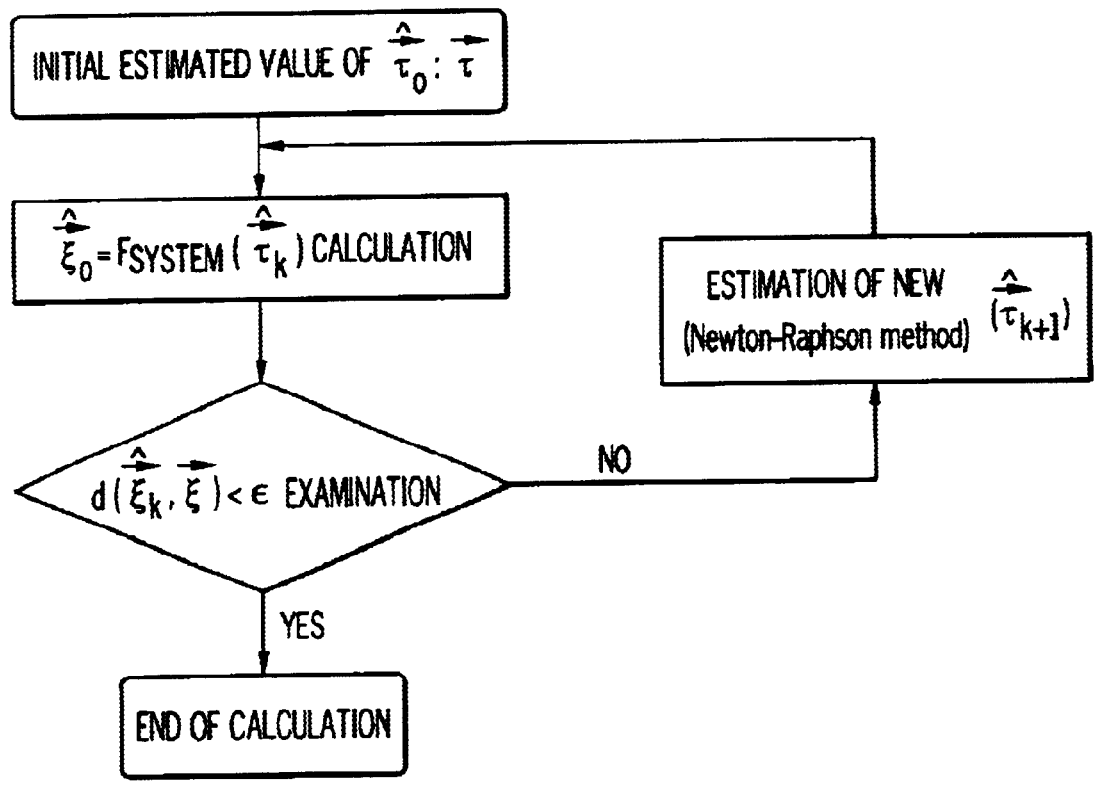
FIG. 8 shows the flow diagram of numerical analysis method for estimating six-degree-of-freedom motions of a three-facet reflector by using the output values of position-sensitive detectors in the invention.

In the present invention, such a work is performed by using the Newton-Raphson method which provides inversion of multiple-variables functions. FIG. 8 shows the steps of performing such a numeric analysis method. When the vector $\vec{\tau}$ consisting of six-degree-of-freedom displacements of a three-facet reflector is defined as $$\vec{\tau} = [t_x \ t_y \ t_z \gamma \beta \alpha]^T$$

and the outputs of three position-sensitive detectors $$\vec{\xi}$$

is defined as $$\vec{\xi} = [\psi_a \ \zeta_a \ \phi_a \ \psi_b \ \zeta_b \ \phi_b \ \psi_c \ \zeta_c \ \phi_c]^T,$$

a one dimensional vector, then a certain relation will hold between the two vectors.

The functional relation between the two vector variables can be expressed by the following Equation 12.

$$\vec{\xi} = F_{system}(\vec{\tau}) \qquad \text{(Equation 12)}$$

In other words, when six-degree-of-freedom displacements of a three-facet reflector is given, a function $F_{system}$ allowing the outputs of three position defectors to be determined exists. For the ultimately desired measurement, the reverse of this function should be found.

In performing actual determination, when an output value $$\vec{\xi}$$

of the three position-sensitive detectors is given, improvement of values $$\vec{\tau}$$

closer to the true or correct value $$\vec{\tau}$$

satisfying the above Equation 12 is conducted by evaluating those estimated values $$\vec{\tau},$$

or through trial and error approach, to determine six-degree-of-freedom displacements $$\vec{\tau}$$

of a three-facet reflector. For the purpose, starting with initially estimated value $$\hat{\vec{\tau}}_o,$$

estimation and evaluation are repeated until the true value $$\vec{\tau}$$

is found, as illustrated in FIG. 8.

In further particular, when the estimated output value $$\hat{\vec{\xi}}_k$$

of the position-sensitive detectors is calculated from the estimated value $$\hat{\vec{\tau}}_k$$

at a certain step, the output value $$\hat{\vec{\xi}}_k$$

is compared with the original value $$\vec{\xi}$$

for the position-sensitive detectors. As seen in the drawing, when the conversion has proceeded such that $$d\left(\hat{\vec{\xi}}_k \cdot \vec{\xi}\right)$$

within the error limit $\epsilon$, wherein $$d\left(\hat{\vec{\xi}}_k \cdot \vec{\xi}\right)$$

stands for the difference between the two vectors as described above, the repetition of estimations is ended. A new estimation $$\hat{\vec{\xi}}_{k+1}$$

of after the evaluation of the estimated output value $$\hat{\vec{\xi}}_k$$

is preferably conducted by using the Newton-Raphson method.

As described above, the apparatus for measuring six-degree-of-freedom motions through use of a three-facet reflector according to the invention has the advantage of the simplicity in construction, low cost in fabrication and convenience in measurement, on the ground that a laser source, three position-sensitive detectors, and a three-facet reflector are used in the measurement of movements.

Furthermore, the apparatus according to the invention has the advantage that it is suited for high-speed motions because it needs no mechanical tracing mechanisms due to the unnecessity of laser tracing and therefore is free from mechanical speed restriction.

It is to be understood that, while the invention was described mainly with respect to specific embodiments, the invention is never restricted to those embodiments and a variety of modifications and alterations would be possible to a man skilled in the art by referring to the description or drawings presented here and within the spirit of the invention and thus those modifications or alterations are to fall within the scope of the invention, which scope should be limited only by the attached claim.

What is claimed is:

1. An apparatus for measuring six-degree-of-freedom motions by using three-facet reflector, the six-degree-of-freedom motions of an object being measured by using the laser beam proceeding from a laser light source, comprising:

a multiple facet reflector in the form of a trigonal pyramid, the multiple facet reflector being fixed on the object for measurement movable within a predetermined range and able to reflect the laser beam in three directions;

three position-sensing detectors for measuring positions and intensities of the laser beam spots formed on their surfaces, with the movement of the multiple facet reflector, and then providing output signals; and a controlling section for analyzing six-degree-of-freedom motions of the multiple facet reflector by using the output signals from the three position sensing detectors;

wherein, the controlling section performs the steps of:

obtaining the positions of the laser beam spots formed on the three position-sensing detectors using surface normal vectors, direction vectors, position vectors of the multiple facet reflector, and direction vectors of the reflected laser beams from the surfaces of the multiple facet reflector;

obtaining centers of weight of the laser beam spots within the spots of the three position-sensing detectors, respectively:

obtaining a light intensity of the laser beam by integrating the distributions of the light intensities; and computing the positions and the light intensity of the laser beam, so as to measure six-degree-of-freedom motions of the multiple facet reflector, using a predetermined numeric analysis under a reasonable assumption that the distribution of the intensity of the laser beam is of the form of a gaussian function.

2. The apparatus for measuring six-degree-of-freedom motions by using three-facet reflector according to claim 1, wherein the range of movement for the multiple facet reflector is within an area irradiated by the laser beam.

3. The apparatus for measuring six-degree-of-freedom motions by using three-facet reflector according to claim 1, wherein the position-sensing detectors correspond to the number of surfaces of the multiple facet reflector.

* * * * *